United States Patent [19]
Aylor

[11] Patent Number: 5,743,712
[45] Date of Patent: Apr. 28, 1998

[54] TURBINE SUPPORT AND ENERGY TRANFORMATION

[75] Inventor: Elmo Edison Aylor, Yerington, Nev.

[73] Assignee: Prime Energy Corporation, Gardnerville, Nev.

[21] Appl. No.: 772,028

[22] Filed: Dec. 19, 1996

Related U.S. Application Data

[63] Continuation of Ser. No. 417,813, Apr. 6, 1995, Pat. No. 5,591,004.

[51] Int. Cl.$^6$ ........................................................ F03D 7/04
[52] U.S. Cl. ..................... 416/42; 416/169 R; 416/170 R; 416/178; 416/187
[58] Field of Search ................... 416/41, 42, 169 R, 416/170 R, 178, 187, 174, 244 R, DIG. 4, DIG. 6; 415/2.1, 4.3, 4.5, 4.1, 173.6; 290/44, 55; 384/549

[56] References Cited

U.S. PATENT DOCUMENTS

| 147,282 | 2/1874 | Pratt | 415/4.3 |
| 1,433,995 | 10/1922 | Fowle | 415/2.1 |
| 1,502,433 | 7/1924 | Johanson | 415/4.1 |
| 4,415,306 | 11/1983 | Cobden | 415/4.5 |
| 4,781,523 | 11/1988 | Aylor | 415/905 |
| 5,221,186 | 6/1993 | Machin | 416/187 |
| 5,425,619 | 6/1995 | Aylor | 416/42 |
| 5,591,004 | 1/1997 | Aylor | 416/42 |

FOREIGN PATENT DOCUMENTS

| 0909378 | 5/1946 | France | 416/41 |
| 1038090 | 9/1953 | France | 16/DIG. 4 |
| 2394689 | 2/1979 | France | 416/DIG. 6 |
| 1231251 | 5/1986 | U.S.S.R. | 416/DIG. 6 |
| 2123487 | 11/1983 | United Kingdom | 416/189 A |

*Primary Examiner*—Christopher Verdier
*Attorney, Agent, or Firm*—Charles F. Schroeder

[57] ABSTRACT

Apparatus for peripherally supporting the rotor of a fluid driven turbine and for power take-off of energy by transformation of peripheral speed of the rotor to use such as to drive one or more electric generators to provide electric power output as determined by available wind energy.

6 Claims, 6 Drawing Sheets

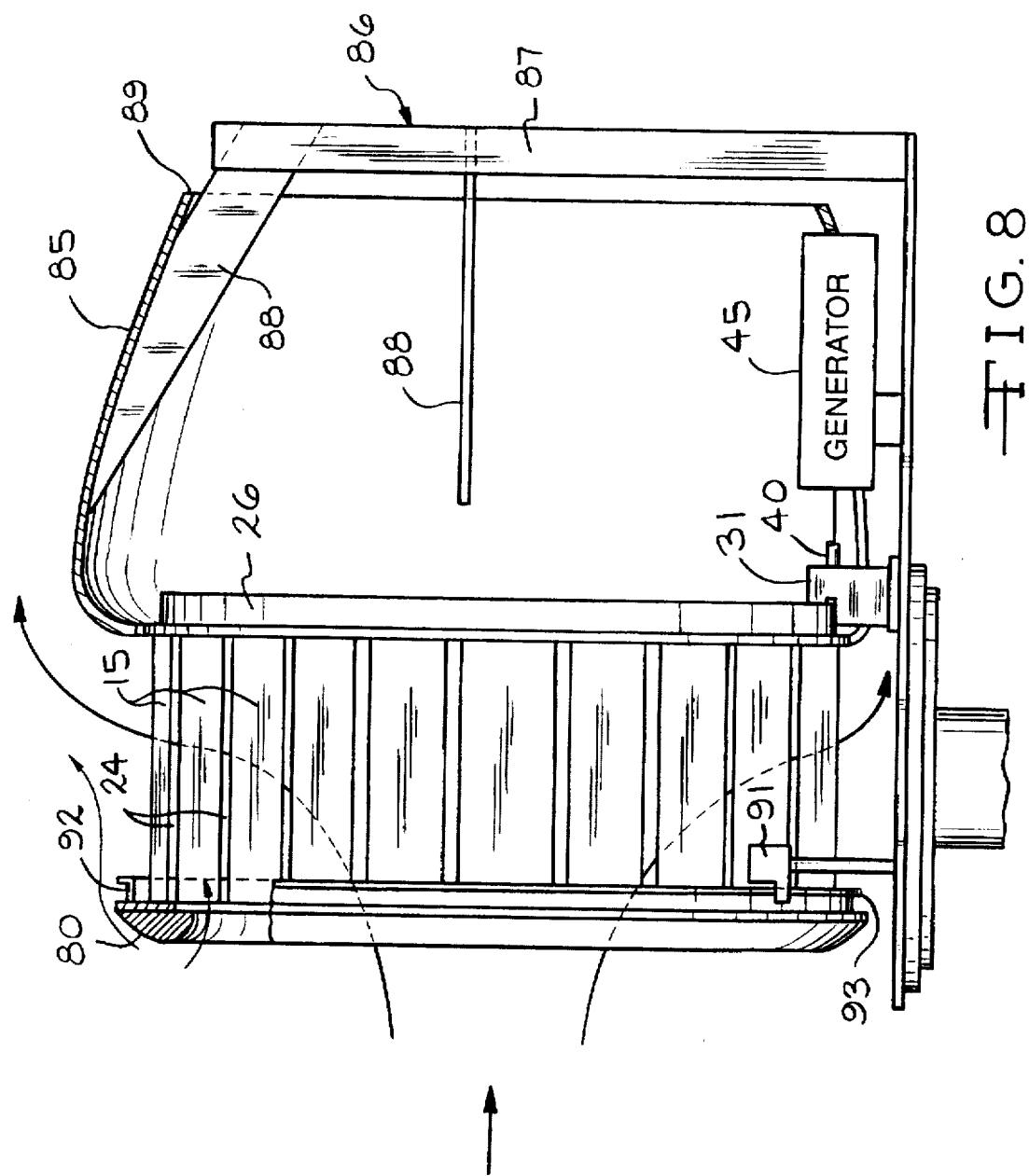

5,743,712

TURBINE SUPPORT AND ENERGY TRANFORMATION

This application is a division of application Ser. No. 08,417,813, filed Apr. 6, 1995, issuing as U.S. Pat. No. 5,591,004 on Jan. 7, 1997.

BACKGROUND AND CROSS REFERENCE TO RELATED APPLICATIONS

The present invention is related to fluid-driven turbine-type energy converters, and more particularly to the support of and translation of the energy of rotation of wind driven turbines to useful mechanical and/or electrical energy. The invention is particularly adaptable to, but not limited to, use with turbines such as are described in my prior U.S. Pat. No. 4,781,523 issued Nov. 1, 1988 for a fluid energy turbine and the turbine described in my pending U.S. patent application Ser. No. 08/143,471 now U.S. Pat. No. 5,425,619 issued on Jun. 20, 1995 for a self governing fluid energy turbine. The present disclosure is a continuation of my application Ser. No. 417,813 filed Apr. 6, 1995 now U.S. Pat. No. 5,591,004 issued on Jan. 7, 1997. The energy take-off from such turbines is conventionally from an axial rotor shaft typically connected to a mechanical transmission unit or directly to an electrical generator. Such an arrangement is convenient and efficient for turbines of conventional size, but for extra large sizes to which such turbines are capable of being constructed, such conventional take-off techniques become cumbersome and less practical.

FIELD OF THE INVENTION

Wind driven power units of the prior art in general have been of two types, namely units which have been rotated about a horizontal axis with blades extending radially outwardly and secondly units which rotate about a vertical axis with blades generally parallel to or bowed longitudinally from the axis of rotation and spaced radially about the axis. In contrast, the wind driven units of the present invention are of a type in which the rotor incorporates a series of blades located generally in a circumferential plane extending generally parallel to and about a horizontal axis of rotation.

The invention is directed to a turbine which may or may not have a central shaft from which a take-off of power can be effected. As the size of a turbine of the type herein described increases, for example, from a range of diameters in the order of 2 to 10 feet, to 60 to 80 feet, the torque at a central shaft for a given horsepower output will reach large and less practical magnitudes while the rotational speed of the shaft diminishes.

Although the angular speed of rotation of a large diameter turbine will be less than that of a smaller diameter turbine receiving the same fluid flow rate, the outer peripheral speed of the large diameter rotor will be close to the outer peripheral speed of the smaller diameter higher speed turbine receiving the same fluid flow rate. Accordingly power take-off from the peripheral region of large diameter turbines can well replace take off power from a slower central shaft. A novel aspect of the invention is the arrangement by which peripheral rotation of the rotor is converted to rotary power for connection to a generator drive shaft.

In addition rotational support for a large diameter turbine rotor of the present invention having a diameter for example in the order of 60 to 80 feet or larger, rather than being supplied by a central shaft, can be uniquely provided by support rolls located peripherally at the bottom or near the bottom of the rotor.

SUMMARY OF THE INVENTION

The present invention is a novel system for support of a wind turbine having a rotor in which a series of blades are distributed in a plane extending circumferentially about and generally parallel to a horizontal axis of rotation. The rotor is mounted on a base under the bottom of the rotor which provides moveable or roll surfaces on which the rotor rests free to rotate subject to wind forces acting to drive the rotor.

Rotation of the rotor subject to wind power is converted to mechanical power for driving one or more electrical generators or fluid pumps connected mechanically to the turbine. A generator driveshaft connection can be made by contact with a rotating peripheral surface of the turbine. Such contact can be made by way of either frictionally driven belts, rolls or gears communicating with either the outer periphery of the rotor or a circumferential hoop-like or ring-like drive band positioned near the outer periphery of the rotor. Such a band provided at both the front and rear of the rotor according to the present invention also provides a mechanism for support of the rotor. That is, a band projecting from the front face side and a like band projecting from the back face side of the rotor can support the entire rotor assembly by means of support rolls located in underlying contacting relation with the projecting bands.

As illustrated herein the front portion of the rotor can be supported on at least two support rolls located in underlying contacting relation with the front band of the rotor while the back or rear portion of the turbine can be supported by a single support roll. Cooperating thrust rollers bearing against the rear of the rotor assist in keeping the rotor in proper lateral alignment for stable rotation by pushing the rotor toward the front of the rotor to a position assuring positive alignment of the front support band with its underlying support rolls. As an alternative preferred in some situations, the two support rolls can be provided under the rear face band with a single support roll under the front face band with thrust rolls appropriately provided on either side of the single support roll.

An object of the invention is to provide an effective system of support for wind turbines having a horizontal axis without need for reliance on a central shaft for support, and particularly adaptable to support of large diameter turbines.

Another object of the invention is to provide a system of power take off from a rotating wind turbine based upon its outer circumferential speed rather than its central angular speed of rotation.

A feature of the invention is its adaptability to convert energy of rotation to useful mechanical and electrical energy by way of communication with the moving peripheral surface of a rotating turbine rotor.

Another feature of the invention is its adaptability to provide a system of support for large diameter wind turbines which makes it possible to mount the turbine rotor for rotational operation with little or no need for an upwardly extending superstructure.

Still another feature of the invention is the ready adaptability of the turbine power take off system to supply power selectively from a single generator or a series of connected generators based upon power available from the wind.

Other objects and features which are believed to be characteristic of my invention are set forth with particularity in the appended claims. My invention, however, both in organization and manner of construction, together with further objects and features thereof may be best understood with reference to the following description taken in connection with the accompanying drawings.

BRIEF DESCRIPTION OF THE DRAWINGS

FIG. 8 is a side elevational view of the turbine of the present invention illustrating partially in cross-section how a fairing structure can be optionally provided to facilitate guidance of air emitted from the slots between blades of the turbine.

DESCRIPTION OF THE PREFERRED EMBODIMENTS

Figure 1:
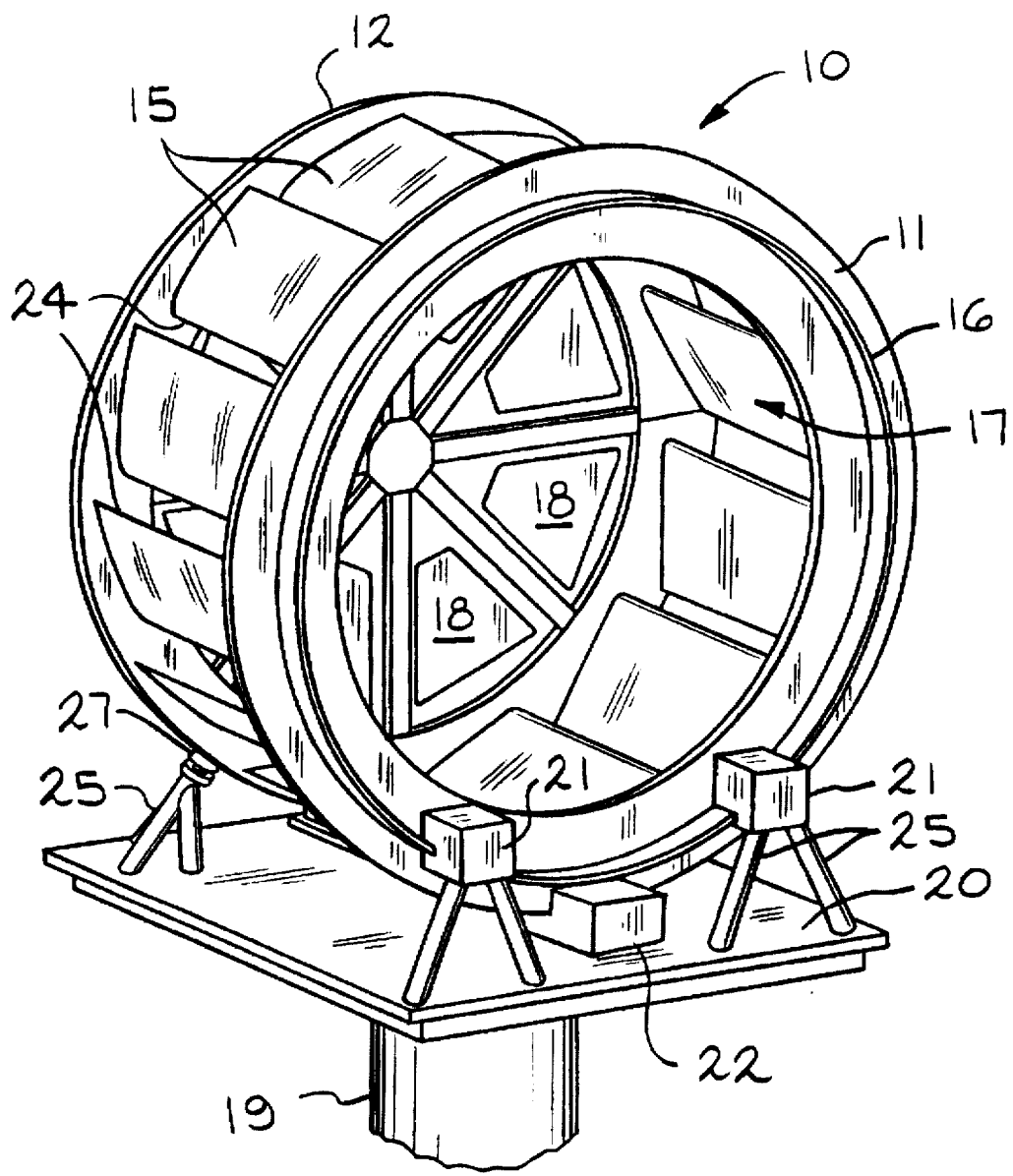
FIG. 1 is a somewhat schematic perspective illustration of the front air inlet side of the turbine of the present invention showing the manner in which it can be rotationally supported in its lower region.

Turning to the drawings in greater detail, FIG. 1 illustrates a turbine assembly of the present invention in which a rotor 10 has a circular front body portion having a front face 11 and a closed circular rear body portion having a rear face 12. A series of rotor blades 15 extend between the front and rear body portions. The front face 11 has an entry opening 17 for entry of air from wind which the rotor is arranged to face. Air introduced to the interior of the rotor is redirected by the closed back portion for release between the blades 15.

The blades 15 are located generally in a circumferential plane parallel to the axis of rotation of the rotor and near the outer periphery of the rotor. The spacing 24 between the blades provides a total area of release of air from the interior of the rotor which is optionally less than of the area of the entry 17 and in this respect may be for example about 40% of the total area of the entry.

For a turbine rotor having a diameter in the order of 2 feet, the blades may have a length of 8 to 12 inches. For larger diameter turbines in which the diameter of the rotor is in the order of 60 to 80 feet the ratio of the diameter to blade length is about 2 to 6. Thus for a turbine having a rotor diameter of 60 feet in diameter, the blade length may typically be about 10 to 30 feet and for a turbine having an 80 foot diameter rotor the blade length may typically be about 10 to 40 feet.

The rotor entry is arranged to face the wind by being mounted on a rotatable horizontal platform 20 mounted off center on a vertical pillar 19 so the turbine entry can be moved into position to face the wind. If the "off center" dimension is sufficiently large the rotor would act as its own weather vane. The orientation of the rotor into the wind can also be accomplished by providing one or more wind vanes in association with the rear of the platform 20, or by providing wind sensors electronically connected to a drive associated with the mounting pillar 19 to cause the platform to position the entry 17 in an optimum direction for wind entry. The height of the mounting pillar 19 can be any of a number of dimensions. For a turbine having a diameter of 2 feet the height might be in the range of 60 to 100 feet whereas for a large diameter turbine, such as one having a diameter of 80 feet, the pillar might have a range of heights in the order of 20 to 80 feet in height.

Figure 3:
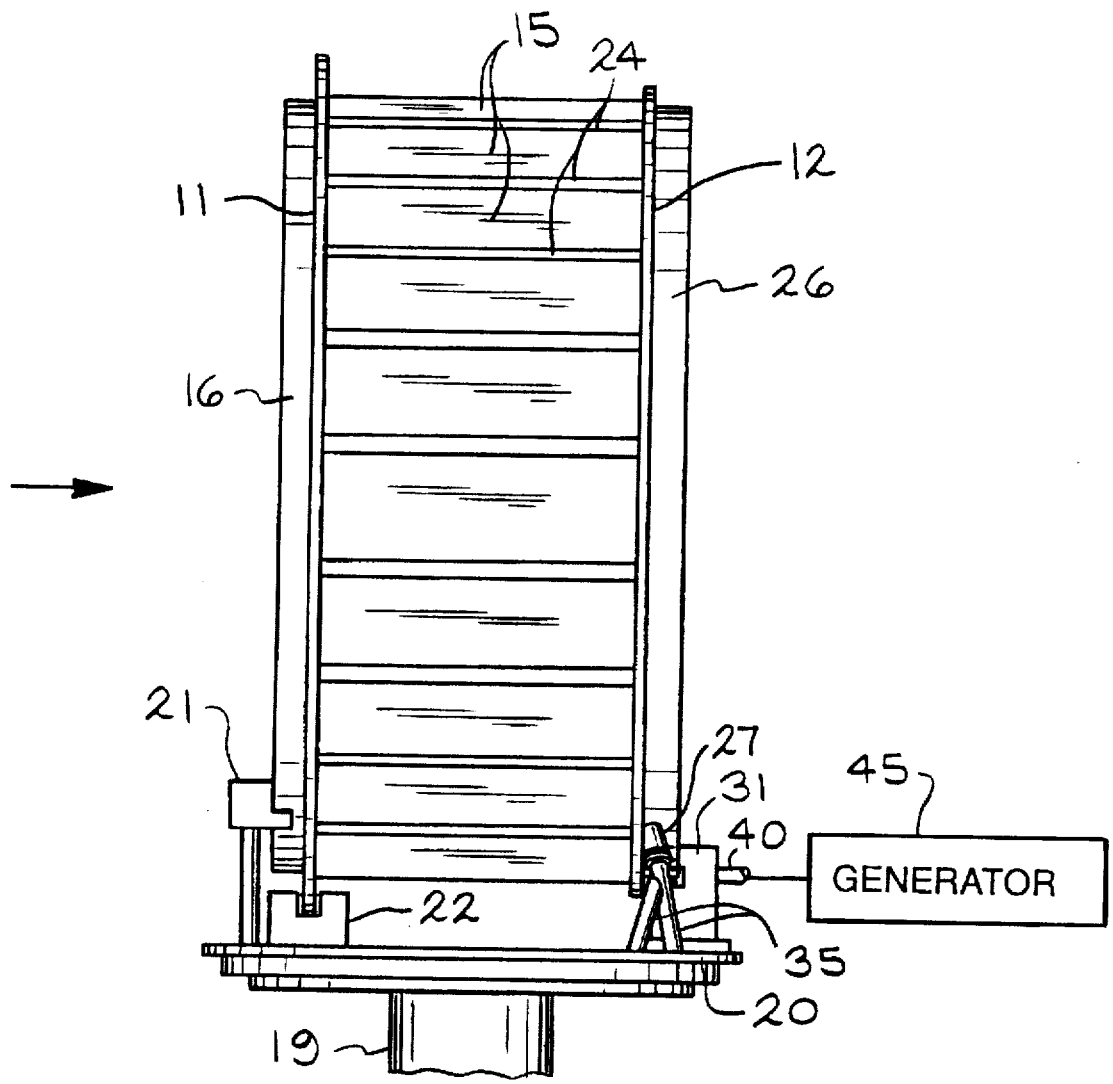
FIG. 3 is a schematic side elevational view of the turbine of FIGS. 2 and 3, illustrating the manner of power take-off from the turbine for driving an electrical generator.

A unique feature of the rotor structure is that the usual central shaft is not necessary for support of the rotor or for the usual central power take-off to drive an electrical generator. In this respect the rotor is supported on a front and rear support ring, like support bands 16 and 26 which project from the front and rear faces 11 and 12 respectively, of the rotor as illustrated in FIG. 3. The support bands 16 and 26 are wide enough to project from their respective faces a sufficient distance to enable underlying support means at both the front and back of the rotor to maintain the rotor in elevated position above the mounting platform 20 and allow the rotor to rotate under the force of wind introduced therein.

FIG. 1 shows two such support means represented as front support pedestals 21 which are mounted on legs 25 and spaced apart laterally equidistant from a mid-position directly under the axis of rotation of the rotor. Correspondingly a somewhat similar rear support pedestal 31 is located directly under the axis of rotation in association with the rear support band 26 to effect a three point support of the rotor on the platform 20. Both support bands 16 and 26 are located slightly radially inward from the outer edges of their respective faces 11 and 12. The front face 11 is somewhat larger in diameter than the rear face so that oncoming wind is deflected somewhat over the blades 15 immediately behind so as not to cause an obstacle to emission of air from the spaces 24 between the blades 15. That is the oncoming ambient flow is lifted by the front face 11 over the blade portions in their regions near the front of the rotor. A brake 22 is provided to halt the turbine or keep the turbine from rotating during desired shut down periods. The brake can be a disk type or magnetic brake which operates in conjunction with a flange portion provided by the front face 11. It can be operated remotely if desired and automatically when extreme weather conditions dictate shutdown.

A set of biased wind gates 18 such for example as six in number are mounted in the back wall 30 of the turbine arranged for release of overflow air when excessive winds are experienced. Each of the gates 18 is generally triangular in shape and is provided with spring biased hinges 28 at a base portion 29. The gates 18 which diminish in dimension toward the center of the back wall and reach their smallest width at a hub 36 of the back wall spars or spokes 37 extending from the hub portion in combination with the hub 36 provide a base against which the gates 18 are biased to seal off the back wall 30 when normal wind conditions are experienced. When excessive winds are confronted, the turbine can still operate effectively because excess or overflow air is released through the gates 18 which are appropriately biased for release of air under predetermined wind conditions.

Figure 2:
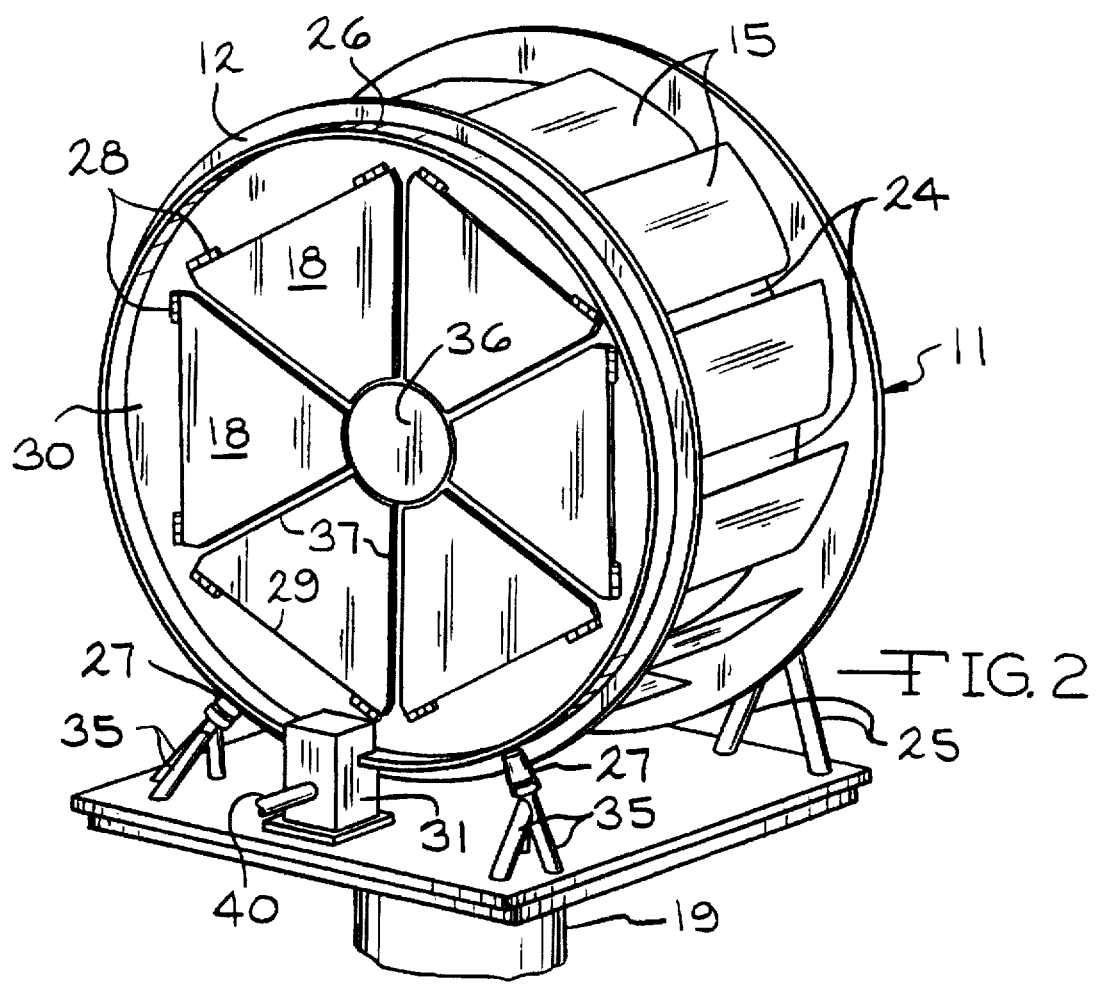
FIG. 2 is a somewhat schematic perspective rear view of the turbine of FIG. 1 illustrating the mechanical support and power take-off for drive of a generator near the lower outer periphery of the turbine.
Figure 5:
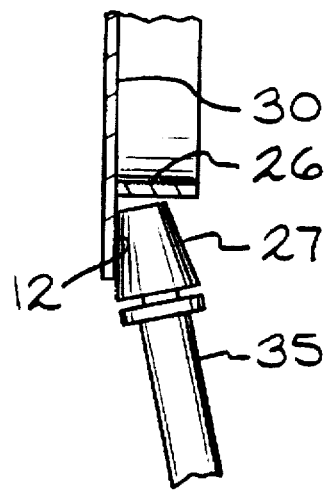
FIG. 5 is an elevational sectional view of a thrust roller mechanism of the type shown in FIGS. 2 and 3 on each side of the drive for the generator at the rear of the turbine.

Further with respect to mounting of the rotor for rotational operation, a thrust mechanism is provided in communication with the rear face 12 to maintain steady engagement of the front band 16 with the support mechanism of the front support pedestals 21. In this regard a pair of tapered thrust rolls 27 shown in FIG. 2 are mounted on legs 35 to position the thrust rolls for contact with the portion of the rear face 12 extending beyond the band 26. The arrangement of tapered thrust rolls in communication with the rear face 12 is illustrated more clearly in FIG. 5 which shows a roll 27 having a tapered or frustroconical shape rotationally mounted on legs 35 in bearing relation against the rear face 12. The degree of taper is more desirably less for larger diameter units than for small units.

Figure 4:
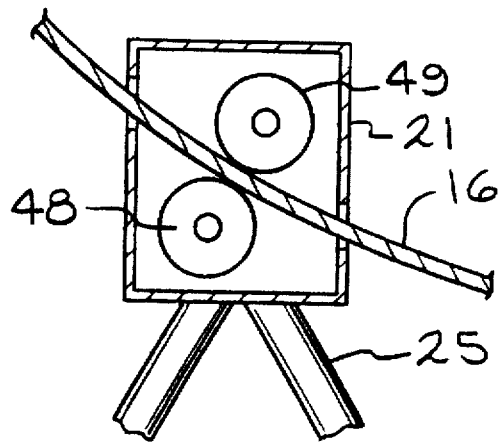
FIG. 4 is a schematic cross sectional elevation view of one of the front side support mechanisms for the rotor of FIG. 1.

FIG. 4 illustrates schematically the interior mechanism of the support pedestals 21 at the front of the rotor showing how the rotor is mounted on a roll 48 underlying the front support band 16 and is steadied by an overlying retainer roll 49 which is pressed against the interior side of the band 16 such as under spring pressure hereinafter further described in detail in relation to FIGS. 6 and 7.

FIG. 3 shows still more clearly how the rotor is supported above the mounting platform 20 on front pedestals 21 and the rear pedestal 31. The thrust rolls 27 make bearing contact with the rear face 12 to maintain the front support band 16 in steady communication with the support rolls 48 as it passes through the support pedestals 21. Thus as wind driven air enters the rotor and is emitted from the spaces 24 between the blades 15 the rotor is rotated on the underlying support rolls 48 of the front and rear pedestals 21 and 31 respectively. A shaft 40 which extends from the support roll 48 of the rear support pedestal 31 drives an electric generator 45 either directly or through associated gear mechanisms. Electrical energy can thus be generated by frictional contact of the support roll 48 with the support band 26 or alternately by means such as by provision of gear teeth on the interior side of the band arranged to drive an engaging pinion on the generator shaft.

Figure 7:
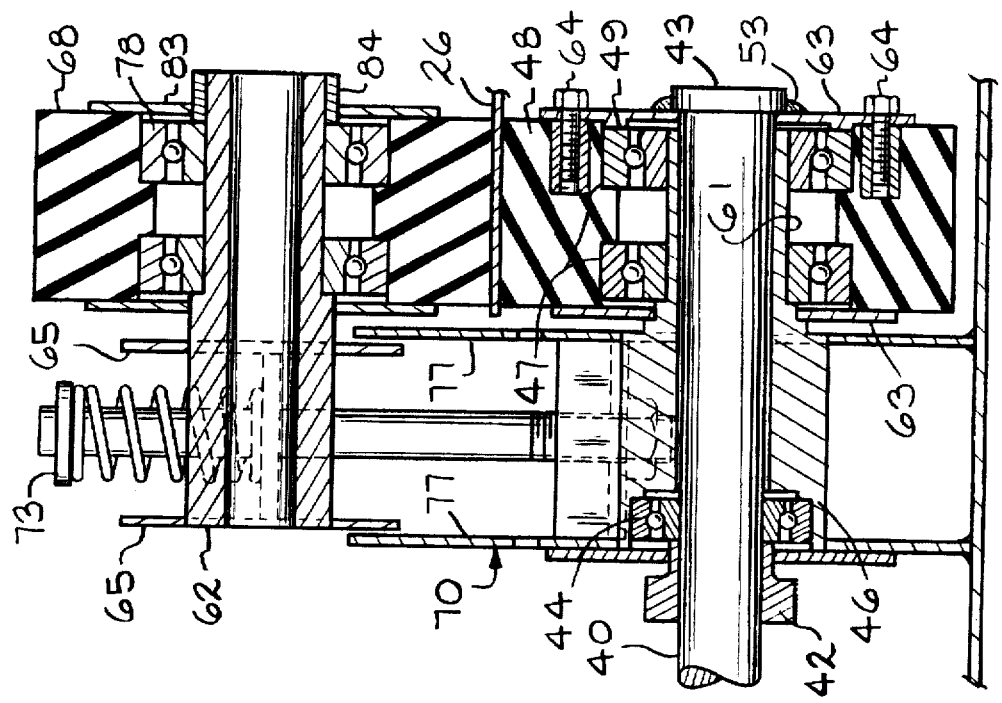
FIG. 7 is a cross sectional view of the roll support and power take-off mechanism of FIG. 6 as taken on line 7—7 of FIG. 6 showing the bearing arrangements for both the frictional roll and the support roll from which the generator drive shaft extends.
Figure 6:
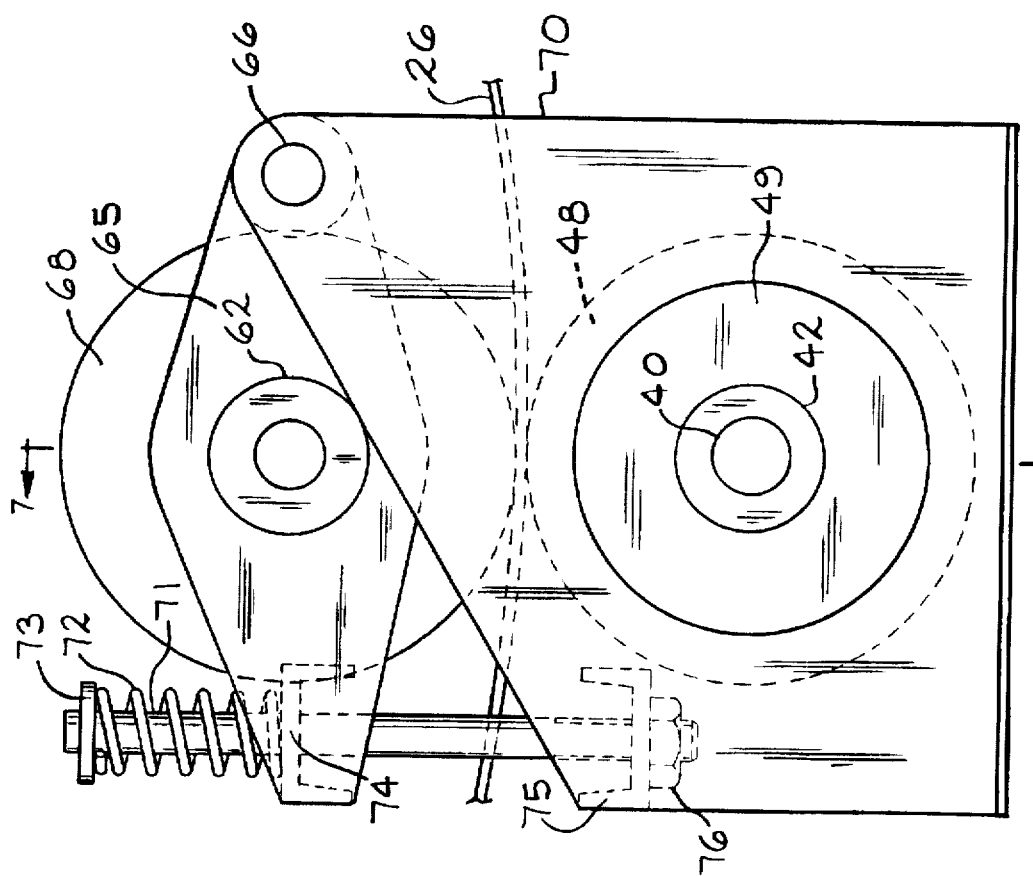
FIG. 6 is an enlarged side elevational illustration of the power take-off mechanism of FIG. 3, partially in dotted lines, showing how frictional roll engagement is made with a rotating band of the turbine for driving an electrical generator.

FIGS. 6 and 7 show more clearly the detailed arrangement by which the rear of the rotor 10 can be supported at its rear face by the support band 26 on a roll 48 having a collar 42 fixed on a shaft 40 which drives the generator 45 shown in FIG. 3. The support roll 48 is mounted for rotation on a stud 46 supported between two upright members 77 of a frame 70. A retaining roll 68 is supported by an overlying retainer arm 65 which is pivotally mounted for vertical movement about a shaft pivot 66 so that the retaining roll 68 can be drawn toward the roll 48 to bear against the inner side of the support band 26. The roll 68 can be formed of wearable material such as hard neoprene mounted on ball type bearings 78 between a pair of seal plates 83 having an associated bearing retainer 84.

As seen in FIG. 6, the arm 65 extends from its pivot 66 on one side of the roll 68 to the opposite side of the roll 68 where the retainer arm has a connector 74 fixed thereto through which a stud 71 passes for connection to another connector 75 fixed to the frame 70. A pressure spring 72 is mounted in surrounding relation with the stud 71 under compression between a spring retainer 73 at one end of the stud and the connector 74. A nut 76 at the other end of the stud 71 is drawn sufficiently tight against the connector 75 to cause the spring 72 to press the retainer arm 65 downwardly so that the retaining roll 68 is drawn under compression toward the support roll 48 underlying the rear support band 26 passing therebetween. The nut 76 can be a wing nut or other means readily operable to enable disengagement of the spring force and release of the roll 48 from driving association with the band 26.

FIG. 7 illustrates more clearly in cross section how the retainer roll 68 is mounted for rotation on the retainer arm 65. A shaft 62 is supported by the arm 65 on which the retainer roll 68 is mounted by on a pair of ball-type bearings 78 in its compression communication with the band 26. The underlying support roll 48 is mounted for rotation in a fixed position to drive the generator power supply shaft 40 which is supported by bearings 47 which are in turn supported by an extension 61 of the stud 46. The roll 48 is provided with a surface of friction material, such as neoprene, and is positioned between two seal plates 63 to which the roll material is secured by bolts 64. The roll 48 is mounted in locked relation to the shaft 40 by welding its side flange 49 to the shaft 40 at a weld 53 which joins it to an enlarged cap-like end 43. The shaft 40 in turn is mounted for rotation relative to the frame 70 on a shaft bearing 44 mounted in the stud 46 which forms part of the mounting frame 70 while a collar 42 acts as a retainer for a shaft bearing 44.

A section of fairing 85 can be advantageously added to the turbine along with a cooperating contoured entry ring 80 as shown in FIG. 8. The contouring of the entry ring is arranged to lift oncoming wind over the outer edge of the entry to the turbine which promotes establishment of a negative pressure in the region immediately behind the entry ring and promotes a smooth non turbulent air flow over the blades. Air release from spaces 24 between the blades 15 is thus assisted with less tendency toward formation of turbulences from entry of air into the turbine and release from the blades.

A hollow trailing fairing structure 85 mates with the radially outer edge of the back 12 of the turbine with only a slight clearance therebetween. The shell-like fairing extends curvilinearly outward and rearward therefrom to provide a smooth outline for flow of air emitted from the blades 15 to facilitate its non-turbulent joinder with ambient air flowing over the turbine. It has been found that the fairing need only extend part way to the rear of the turbine and need not reach back to form a complete enclosure to provide the smooth air flow characteristics desired. Thus a rear opening 89 is provided of adequate size for release of overflow or pressured air of heavy winds passing through the biased gates in the back of the rotor. Also a support structure for the fairing shell can be provided by extension through the opening 89.

The fairing structure is mounted in stationary relation behind the turbine on a frame 86 formed of generally vertical members 87 from which rib members 88 extend forward for supporting joinder with the inner surface of the fairing structure. The fairing structure in a sense surrounds the generator 45 by providing an opening in the shell in the lower region in which the generator 45 is located.

In the arrangement as shown in FIG. 8 the front support and retainer rolls can be incorporated in a support pedestal 91 which engages a rearwardly extending support band 92 having a short retaining lip 93 which provides a guide against lateral motion of the rotor and which in cooperation with the rear support band 26 functions in association with the rear support pedestal 31 in its rotational support of the turbine rotor assembly.

Figure 9:
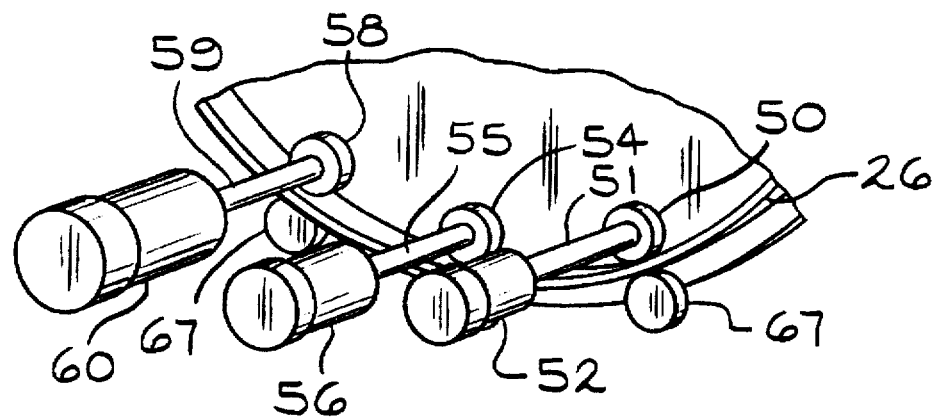
FIG. 9 is a partial view of the rear of the turbine of FIG. 1 illustrating another arrangement for power take-off whereby a number of electrical generators can be driven by the upper rotating surface of the turbine.

FIG. 9 illustrates an example of another arrangement of the present invention in which a number of a series of generators are driven by the turbine. The generators may be of the same size for operation together or individually, or can be of different sizes such as represented by illustrated generators 52, 56 and 60. The generators as illustrated are frictionally driven by the rotating band 26 of the turbine each by a respective roll in contact with the drive band 26. Each frictionally driven roll is pressed into positive contacting relationship with the band 26 by cooperative pressure provided by association with an underlying support and retaining roll in a manner represented by the mechanism of FIGS. 6 and 7. Each drive roll and an underlying support roll are spring drawn to each other to cause pressure engagement of the drive and retaining rolls against the upper and under surfaces of the supporting drive band 26. Specifically as represented in FIG. 9, the smaller generator 52 is friction driven by a roll 50 having an underlying supporting and retaining roll 67, both of which contact the band 26 to supply power to the driveshaft 51 for the generator 52. Similarly the generators 56 and 60 are driven by friction rolls 54 and 58 respectively, which supply power to the generator driveshafts 55 and 59 respectively. A support roll 67 underlying each of the drive rolls 50, 54 and 58 is held in compression with the drive rolls by spring mechanisms which hold the rolls in pressure relation with the band 26 projecting from the back 30 of the turbine 10.

The generators as illustrated have different power output ratings which for example may be 100, 175, and 250 KW, all of which may be driven simultaneously in heavy winds. Alternately the generators may be selectively connected for supply of power from one or two of the generators for an amount of power output desired as wind conditions dictate. Such a system can be computerized to electrically connect the generator outputs optimumly or as desired within the total output available under different wind conditions.

A number of variations of the arrangements disclosed are contemplated by the invention such for example by provision of conventional release mechanisms for disengaging operation of one or more generators by which mechanical pressure is released between the drive and support rolls held in compression. Further, additional support pedestals can be provided, both at the front and back portions of the rotor, as structural conditions dictate.

In view of the foregoing it will be understood that many variations of the disclosed invention can be made within the broad scope of the principles embodied therein. Thus while particular preferred embodiments have been shown and described, it is intended by the appended claims to cover all such modifications which fall within the true spirit and scope of the invention.

I claim:
1. An air driven turbine comprising
  a rotor having a generally horizontal axis of rotation,
  said rotor having a front portion providing a circular front face for said rotor and a back portion parallel to and spaced from said front portion providing a circular back face for said rotor,
  a plurality of blades distributed in spaced side-by-side relation extending between said front and back portions about said axis of rotation,
  said distributed blades defining an interior of said rotor,
  said front face having an entry opening for air flow into said rotor interior and for release from between said blades,
  said blades across their width being shaped and angularly pitched to the flow of air therebetween to effect rotation of said rotor,
  a system of support for said rotor including a pair of circular rotor-support rings concentric with said axis of rotation,
  each of said rings being located on one of said faces near the outer circumferential edge of the respective face with which it is associated,
  an underlying rotatable support roll mounted in rotational supporting association with the support ring of one of said faces for support of one side of said rotor,
  an additional rotatable support roll mounted in underlying rotational supporting association with the support ring of the face of said rotor opposite said one face for rotational support of the side of said rotor opposite said one side, whereby said rotor is rotationally supported at both its front and back sides for rotation about said generally horizontal axis subject to the forces of the air blown into said rotor,
  a power take-off shaft driven by one of said support rolls functioning as a power take-off roll,
  a backup roll overlying said power take-off roll and contacting the inner surface of the ring with which said power take-off roll is associated, and
  a spring biasing assembly including,
    a spring under compression for drawing said backup roll toward said power take-off roll in compression contact with opposite surfaces of the ring with which they are associated.
2. An air driven turbine for wind power conversion comprising
  a rotor having a generally horizontal axis of rotation,
  a plurality of blades distributed in spaced side-by-side relation generally in a cylindrical plane about said axis of rotation,
  said blades being shaped and pitched to the flow of air therebetween to effect rotation of said rotor,
  a system of rotary power take-off from said rotor including a power supply ring concentric with and rotatable on said rotor about said axis of rotation,
  said ring being located on said rotor generally in said cylindrical plane at one end of said plurality of side-by-side blades,
  a power take-off roll and an associated power shaft extending axially therefrom,
  a roll support frame,
  said power take-off roll being mounted on said frame for frictional communication with said ring,
  a backup roll positioned for rotation in frictional communication with said ring on the side of said ring opposite from said power take-off roll,
  said backup roll being mounted between two ends of a retainer arm pivotally mounted at one end in said frame to permit movement of said backup roll toward and away from said power take-off roll and,
  a spring assembly connected between the end of said retainer arm opposite said pivotally mounted end and said roll support frame arranged to press said backup roll toward said power take-off roll in biased relation in frictional engaging relation with said ring on opposite sides of said power supply ring.
3. An air driven turbine as set forth in claim 1 in which said spring assembly includes a connector at said opposite end of said retainer arm,
  a second connector fixedly mounted in said frame, and
  said spring assembly extending between said connectors to provide the biased relation between said backup and power take-off rolls.
4. An air driven turbine as set forth in claim 3 in which said spring assembly includes a stud extending between said two connectors,
  said stud being secured to said second connector and arranged to extend a distance beyond said retainer arm connector and
  a spring surrounding said stud and extending in compression relation with the extending end of said stud and said retainer arm connector to provide the biased relation between said rolls.

5. An air driven turbine as set forth in claim 2 in which said power take-off roll underlies said ring and said backup roll overlies said ring.

6. An air driven turbine as set forth in claim 2 in which said power take-off roll is positioned to additionally act as a support roll for said rotor.

* * * * *